(12) United States Patent
Giroir-Fendler et al.

(10) Patent No.: US 10,837,335 B2
(45) Date of Patent: Nov. 17, 2020

(54) REACTIVE FILTER FOR MOTOR VEHICLE

(71) Applicants: VOLVO TRUCK CORPORATION, Gothenburg (SE); Centre national de la recherche scientifique, Paris (FR); Université Claude Bernard Lyon 1, Villeurbanne (FR)

(72) Inventors: Anne Giroir-Fendler, Sainte Foy les Lyon (FR); Sonia Gil Villarino, Villeurbanne (FR); Eduard Emil Iojoiu, Vourey (FR)

(73) Assignees: VOLVO TRUCK CORPORATION, Gothenburg (SE); CENTRE NATIONAL DE LA RECHERCHE SCIENTIFIQUE, Paris (FR); UNIVERSITE CLAUDE BERNARD LYON 1, Villeurbanne (FR)

( * ) Notice: Subject to any disclaimer, the term of this patent is extended or adjusted under 35 U.S.C. 154(b) by 0 days.

(21) Appl. No.: 15/771,999

(22) PCT Filed: Oct. 29, 2015

(86) PCT No.: PCT/IB2015/002177
§ 371 (c)(1),
(2) Date: Apr. 27, 2018

(87) PCT Pub. No.: WO2017/072546
PCT Pub. Date: May 4, 2017

(65) Prior Publication Data
US 2018/0223711 A1    Aug. 9, 2018

(51) Int. Cl.
*F01N 3/035* (2006.01)
*B01D 53/94* (2006.01)
(Continued)

(52) U.S. Cl.
CPC .......... *F01N 3/035* (2013.01); *B01D 53/944* (2013.01); *B01D 53/9418* (2013.01); *B01J 29/08* (2013.01);
(Continued)

(58) Field of Classification Search
None
See application file for complete search history.

(56) References Cited

U.S. PATENT DOCUMENTS 5,248,643 A * 9/1993 Patil .................... B01J 37/0246
423/709
2003/0162649 A1    8/2003 Basso et al.
(Continued)

FOREIGN PATENT DOCUMENTS

DE   10 2004 041836 A1    3/2006
EP   0 314 336 A2    5/1989
(Continued)

OTHER PUBLICATIONS

International Search Report, dated Jun. 30, 2016, from corresponding PCT/IB2015/002177 application.

*Primary Examiner* — Jelitza M Perez
(74) *Attorney, Agent, or Firm* — Nixon & Vanderhye

(57) ABSTRACT

Disclosed is a reactive filter, that is a selective catalytic reduction filter or an oxidative reaction filter, including a porous substrate including internal pores having their inner surface, totally or partially, directly coated with a catalytic zeolite material resulting from an in situ hydrothermal synthesis. Also disclosed is a process for preparing such a reactive filter and the use thereof in an engine exhaust depolluting system.

20 Claims, 8 Drawing Sheets

(51) Int. Cl.
| | |
|---|---|
| *B01J 29/08* | (2006.01) |
| *B01J 29/40* | (2006.01) |
| *B01J 29/60* | (2006.01) |
| *B01J 29/70* | (2006.01) |
| *F01N 3/20* | (2006.01) |
| *F01N 3/28* | (2006.01) |
| *B01J 35/04* | (2006.01) |
| *B01J 29/72* | (2006.01) |
| *B01J 37/10* | (2006.01) |
| *B01J 29/10* | (2006.01) |
| *B01J 35/10* | (2006.01) |
| *B01J 29/42* | (2006.01) |
| *B01J 29/61* | (2006.01) |
| *B01J 35/00* | (2006.01) |
| *B01J 29/85* | (2006.01) |
| *B01J 35/02* | (2006.01) |
| *B01J 37/02* | (2006.01) |

(52) U.S. Cl.
CPC ............ *B01J 29/10* (2013.01); *B01J 29/40* (2013.01); *B01J 29/42* (2013.01); *B01J 29/60* (2013.01); *B01J 29/61* (2013.01); *B01J 29/7007* (2013.01); *B01J 29/7015* (2013.01); *B01J 29/723* (2013.01); *B01J 29/7207* (2013.01); *B01J 29/7215* (2013.01); *B01J 29/85* (2013.01); *B01J 35/0006* (2013.01); *B01J 35/023* (2013.01); *B01J 35/04* (2013.01); *B01J 35/10* (2013.01); *B01J 35/1057* (2013.01); *B01J 35/1061* (2013.01); *B01J 35/1066* (2013.01); *B01J 37/0215* (2013.01); *B01J 37/10* (2013.01); *F01N 3/2066* (2013.01); *F01N 3/2828* (2013.01); B01D 2255/50 (2013.01); B01D 2255/502 (2013.01); B01D 2255/504 (2013.01); B01D 2255/9155 (2013.01); B01D 2255/9202 (2013.01); B01D 2255/9205 (2013.01); B01J 2229/64 (2013.01); B01J 2229/66 (2013.01); F01N 2330/06 (2013.01); F01N 2330/30 (2013.01); F01N 2370/04 (2013.01); F01N 2510/063 (2013.01); Y02A 50/20 (2018.01); Y02C 20/10 (2013.01); Y02T 10/12 (2013.01)

(56) References Cited

U.S. PATENT DOCUMENTS

| | | |
|---|---|---|
| 2007/0110649 A1 | 5/2007 | Kusakabe et al. |
| 2011/0158871 A1* | 6/2011 | Arnold .................. B01J 23/464 423/212 |
| 2014/0271426 A1* | 9/2014 | Casci ................. B01D 53/9418 423/213.2 |

FOREIGN PATENT DOCUMENTS

| | | | |
|---|---|---|---|
| EP | 0 599 117 A1 | 6/1994 | |
| EP | 0 649 387 A1 | 4/1995 | |
| EP | 0 808 655 A1 | 11/1997 | |
| EP | 0649387 B1 * | 8/1998 | .......... C07C 5/3337 |
| WO | 94/01365 A1 | 1/1994 | |
| WO | 2009/005745 A1 | 1/2009 | |

* cited by examiner

REACTIVE FILTER FOR MOTOR VEHICLE

The invention relates to a reactive filter, that is a selective catalytic reduction filter or an oxidative reaction filter, comprising a porous substrate comprising internal pores having their inner surface, totally or partially, directly coated with a catalytic zeolite material resulting from an in situ hydrothermal synthesis. The invention also relates to a process for preparing such a filter and the use thereof in an engine exhaust depolluting system.

The invention thus relates to the field of engine exhaust depolluting systems also known as exhaust air treatment systems, in particular for diesel engine vehicles.

In this field of technology, there is an increased need of engine exhaust depolluting systems providing improved efficiency. Providing selective catalytic reduction filters or oxidative reaction filters is thus important. It is also important to provide reactive filters that are highly selective in lowering $N_2O$ producing reactions. By "selective catalytic reduction filters", it is understood filters combining particulate filter functions such as Diesel particulate filter functions (DPF function) and Selective Catalytic Reduction functions (SCR function). By "oxidative reaction filters", it is understood filters combining particulate filtering functions and oxidative reaction functions.

There is also an increased need of engine exhaust depolluting systems having a size that is reduced in comparison to the existing systems.

In this field of technology, there is a continuous need of providing improved methods for manufacturing efficient engine exhaust depolluting systems, in particular method avoiding clogging a substrate by uncontrolled deposition or coating with a catalytic material.

Indeed, there exist some techniques whereby a previously prepared catalytic material is deposited in the internal structure of a porous substrate. The reactive filter thus obtained is known as a coated particulate filter and in a diesel engine such a reactive filter is known as a coated diesel particulate filter or coated DPF. However, these known coating processes often encounter problems due to the physical limits linked to the porous substrate that is used. When coating a porous substrate with a catalytic material, pores of optimal size regarding particle filtration lead to clogging problems when they are coated according to the known coating processes. A corresponding coated porous substrate structure is, for instance, represented on FIG. 4b. On the other hand, pores of larger size limit filtration efficiency.

Clogging problems may lead to backpressure issues in a filter. Uncontrolled or excessive backpressure may cause problems into an engine, for example higher gas consumption, excessive temperature, or may even lead to a breakdown of the filter.

For the techniques of the prior art, analogue problems occur when the porosity of a porous substrate is considered. Upon depositing a catalytic material into a porous substrate of low porosity installed into a filter, clogging problems appear while carrying out such a deposition into a substrate of high porosity and lead to a filtering capacity that is insufficient.

There is thus an increased need of techniques allowing preventing such problems, in particular a need of techniques allowing controlling or increasing the coating capacities for preparing reactive filters comprising catalytic zeolite materials into the inner structure of a porous substrate.

Making available such a technique that is not depending on the mean pore size of the porous substrate neither on the intrinsic porosity of the porous substrate is also of great importance.

Apart, improving the efficiency of a defined amount of catalytic material deposited into a reactive filter is also important. Notably, there is a need of a coating process allowing an increase of the active surface of a catalytic material relatively to the volume of a porous substrate. In coated DPF applications, there is also a need of making possible an efficient coating with as less as 120 g of catalytic material per liter of porous substrate. Making available such a process whereby 50 to 100 g or even 10 to 20 g of catalytic zeolite material per litre of porous substrate can be coated to obtain a coated DPF having at least the same efficiency in term of catalytic activity as a common Selective Catalytic Reduction system is of great importance.

The invention thus provides a reactive filter and a process for its preparation that allow solving all or part of the problems of the techniques of the prior art.

BRIEF DESCRIPTION OF THE INVENTION

The invention provides a reactive filter, characterized in that it comprises a porous substrate comprising internal pores having their inner surface, totally or partially, directly coated with a catalytic zeolite material resulting from an in situ hydrothermal synthesis.

The invention also provides a process for preparing a reactive filter selected from a selective catalytic reduction filter and an oxidative reaction filter, and comprising a porous substrate having particulate filter function and a catalytic reduction function or an oxidative reaction function, wherein the porous substrate comprises internal pores having their inner surface, totally or partially, directly coated with a catalytic zeolite material resulting from an in situ hydrothermal synthesis, characterized in that it comprises the following steps:
  a) preparing a medium comprising water, at least one zeolite material precursor derivative, at least one active catalytic species precursor;
  b) providing a porous substrate having an intrinsic porosity comprised between 5 and 90%, preferably between 30 and 70% when the reactive filter is a selective catalytic reduction filter to treat exhaust gas emitted by a vehicle engine, such as those emitted by a diesel engine, and more preferably between 55 and 65%; and an intrinsic mean pore size comprised between 0.1 and 100 µm, between 1 and 30 µm when the reactive filter is a selective catalytic reduction filter to treat exhaust gas emitted by a vehicle engine, such as a diesel engine, preferably between 5 and 25 µm;
  c) contacting the porous substrate provided at step b) with the medium prepared at step a);
  d) conducting an in situ hydrothermal synthesis in an autoclave reactor wherein the temperature is comprised between 160 and 250° C. and during 30 min to 10 days;
  e) eliminating the zeolite structure template agent or the zeolite structure directing agent by a heating treatment at a temperature comprised between 100 and 1200° C., preferably between 160 and 850° C. in the presence of oxygen and an inert gas such as nitrogen.

Preferably, the medium prepared according to step a) further comprises at least one zeolite structure template agent or at least one zeolite structure directing agent.

The invention further provides an engine exhaust depolluting system, preferably a diesel engine exhaust depolluting system, characterized in that it comprises a reactive filter according to the invention.

An automotive vehicle, preferably a diesel automotive vehicle, comprising a selective reactive filter according to the invention or comprising a system according to the invention, is also part of the invention.

BRIEF DESCRIPTION OF THE DRAWINGS

With reference to the appended drawings, below follows a more detailed description of embodiments of the invention cited as examples.

In the drawings:

FIG. 1b represents a cross section view of the selective catalytic reduction filter 1 of FIG. 1a.

FIG. 8b represents a zoom magnification of detail C on FIG. 8a.

DETAILED DESCRIPTION OF THE INVENTION

The invention primarily provides a reactive filter, characterized in that it comprises a porous substrate comprising internal pores having their inner surface, totally or partially, directly coated with a catalytic zeolite material resulting from an in situ hydrothermal synthesis.

Preferably, the filter according to the invention is a selective catalytic reduction filter or an oxidative reaction filter. More preferably, the reactive filter according to the invention is a selective catalytic reduction filter. Even more preferably, the filter according to the invention is highly selective in lowering $N_2O$ by reduction reactions.

In the reactive filter according to the invention, the internal pores of the porous substrate having their inner surface, totally or partially, directly coated with a catalytic zeolite material provides a number of functionalities. The reactive filter thus allows having the substances to be degraded being adsorbed and retained in the porous structure, even at low temperature. These substances can also be oxidized. The nitrogen oxides can also be reduced in the reactive filter according to the invention.

Figure 1A:
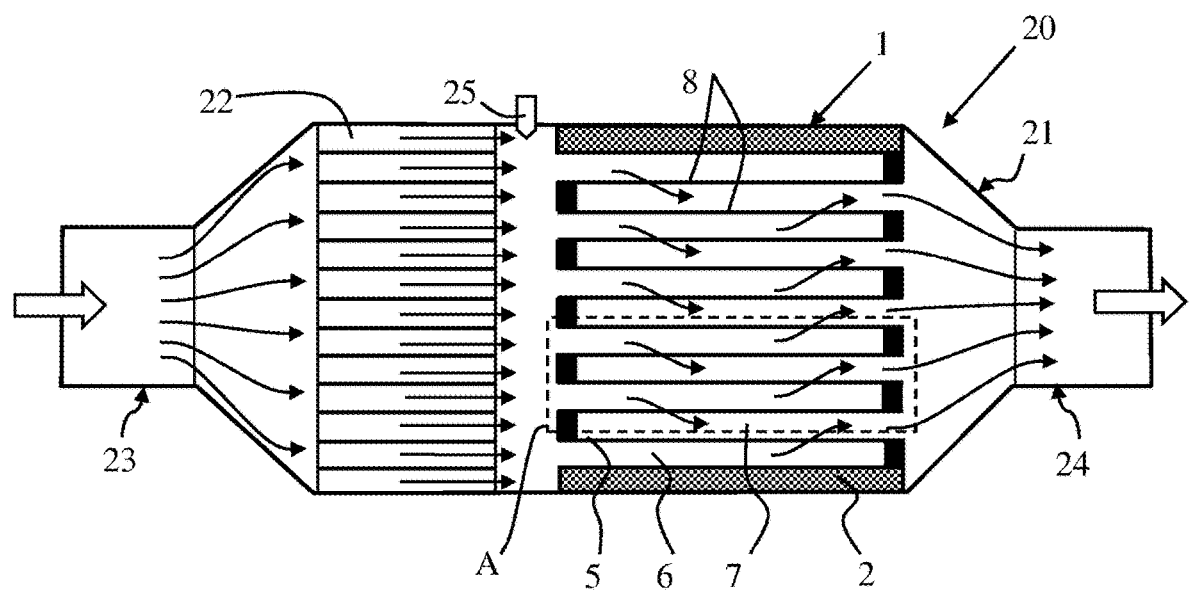
FIG. 1a represents an axial section view of an engine exhaust depolluting system 20 comprising selective catalytic reduction filter 1 according to the invention.
Figure 1B:
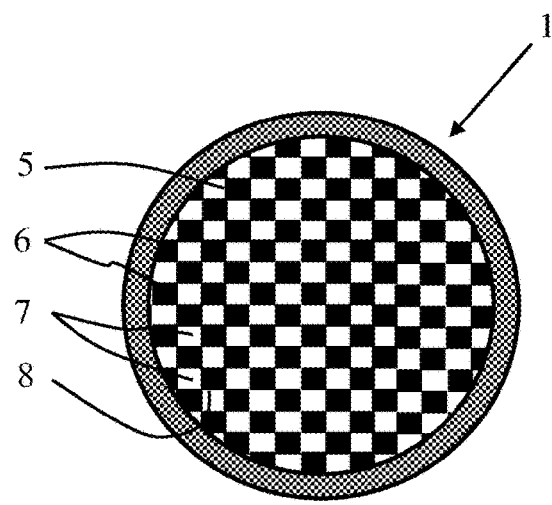

A selective catalytic reduction filter 1 according to the invention is represented on FIGS. 1a and 1b.

On FIG. 1a, the selective catalytic reduction filter 1 is represented in an operating state and is represented in a diesel engine exhaust depolluting system 20.

Such a diesel engine exhaust depolluting system 20 comprises a housing 21, a main inlet 23 and a main outlet 24. Arranged upstream from the selective catalytic reduction filter 1 and in the housing 21, the diesel engine exhaust depolluting system 20 may comprise a diesel oxidation catalytic unit 22 (DOC unit). A diesel engine exhaust depolluting system 20 such as represented on FIG. 1a generally comprises a urea injector that is located upstream from the selective catalytic reduction filter 1 and preferably between the DOC unit 22 and the selective catalytic reduction filter 1.

The selective catalytic reduction filter 1 comprises a porous substrate 5 having generally the form of a honeycomb structure. The honeycomb structure comprises channels 6, 7 whose extremities are alternatively closed to form upstream channels 6 and downstream channels 7 separated by porous partition walls 8. Such a honeycomb structure of the porous substrate is also known as a monolith structure. The gases exhausted by the engine and flowing through the selective catalytic reduction filter 1 have to flow through the partition porous walls 8 in order to pass from an upstream channel 6 to a downstream channel 7. Partition porous walls 8 are able on one hand to trap particles, for instance carbon particles, contained in the exhaust gases emitted by the engine and on the other hand to reduce nitrogen oxides ($NO_x$) thanks to the catalytic zeolite material 10 that coats the inner surfaces 12 of the internal pores 11 of the porous partition walls 8.

The selective catalytic reduction filter 1 may comprise a metallic casing 2 that surrounds the porous substrate 5.

Figure 4A:
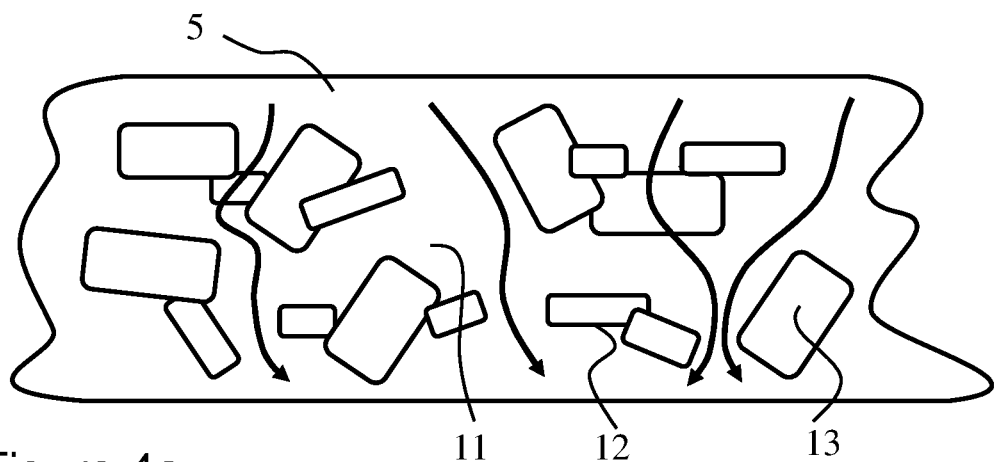
FIG. 4a represents the inside structure of a porous wall 8 of a porous substrate 5 without coating or before coating with a catalytic zeolite material.
Figure 4B:
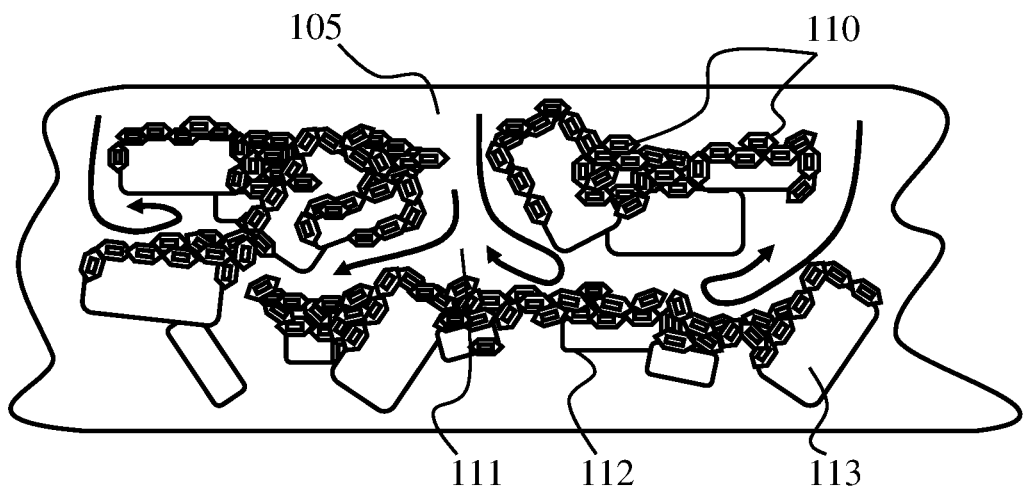
FIG. 4b represents the inside structure of a porous wall of a porous substrate 105 coated, according to a known coating process, with a catalytic zeolite material 110.
Figure 4C:
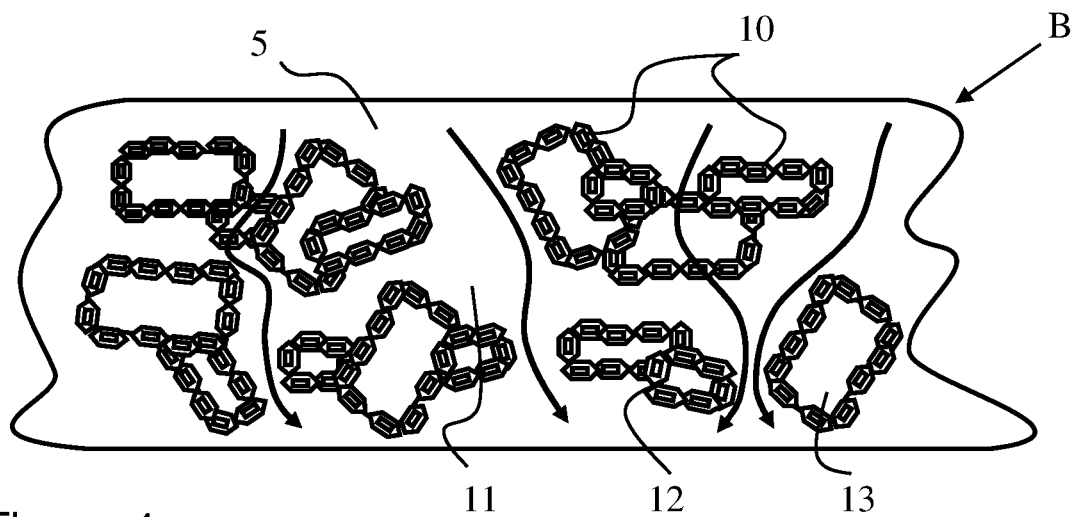
FIG. 4c represents the inside structure of a porous wall 8 of a porous substrate 5 coated, according to the process of the invention, with a catalytic zeolite material 10.

In a porous substrate 5 of a selective catalytic reduction filter that is coated according to the invention and whose structure is partially represented by schematic of FIG. 4c, the catalytic zeolite material 10 coats the inner surfaces 12 of the internal pores 11 of the porous substrate 5 in a more homogenous manner than in a selective catalytic reduction filter prepared by conventional coating processes and whose structure of the resulting coated porous substrate 105 is partially represented on FIG. 4b.

Indeed, in a coated porous substrate 105 represented on FIG. 4b and prepared according to a conventional process from an initial porous substrate 5 having equivalent properties to an initial porous substrate 5 used in the present invention, the catalytic zeolite material 110 has a tendency to accumulate on the first layers of the coated porous substrate 105 with an heterogeneity of coverage on the inner surfaces 112 of the internal pores 111 while central layers of the coated porous substrate are less coated or even not coated. This causes in the resulting reactive filter and for the same quantity of catalytic zeolite material used per litre of porous substrate 5 some backpressure effects which are more important than in the reactive filter of the invention. Another drawback is that catalytic active surfaces in the selective catalytic reduction filter such as obtained by conventional coating processes are more limited compared to a selective catalytic reduction filter according to the invention.

That is a reason why a selective catalytic reduction filter according to the invention offers a greater catalytic active surface than in a conventional selective catalytic reduction filter and therefore has an increased catalytic activity in comparison with a conventional selective catalytic reduction filter prepared by conventional coating procedure and used at the same final backpressure in the filter and wherein the conventional coating procedure is carried out starting from a zeolite that is contacted with a porous substrate further to its preparation.

The porous substrate 2 of the reactive filter according to the invention can be prepared in a large variety of material. Preferably, the material used for preparing the porous substrate is selected in the group consisting of
  a) ceramic-like materials, ceramic materials,
  b) cordierite ceramic, α-alumina, silicon carbide, aluminium titanate, silicon nitride, zirconia, mullite, spodumene, alumina-silica-magnesia, zirconium silicate,
  c) one or more metal alloys, metal alloys, metals, porous refractory metals,
  d) titanium oxide, aluminium, iron, steel, carbon,
  e) stainless steel, iron alloys, nickel alloys, chromium alloys, aluminium alloys, titanium alloys.

According to the invention, alloys may comprise small or trace amounts of one or more additional metal, for example small or trace amounts of manganese, copper, vanadium, titanium.

Preferably, the material used for preparing the porous substrate 5 is selected in the group consisting of cordierite, α-alumina, silicon carbide, aluminium titanate, silicon nitride, zirconia, mullite, spodumene, alumina-silica-magnesia, zirconium silicate.

Figure 2:
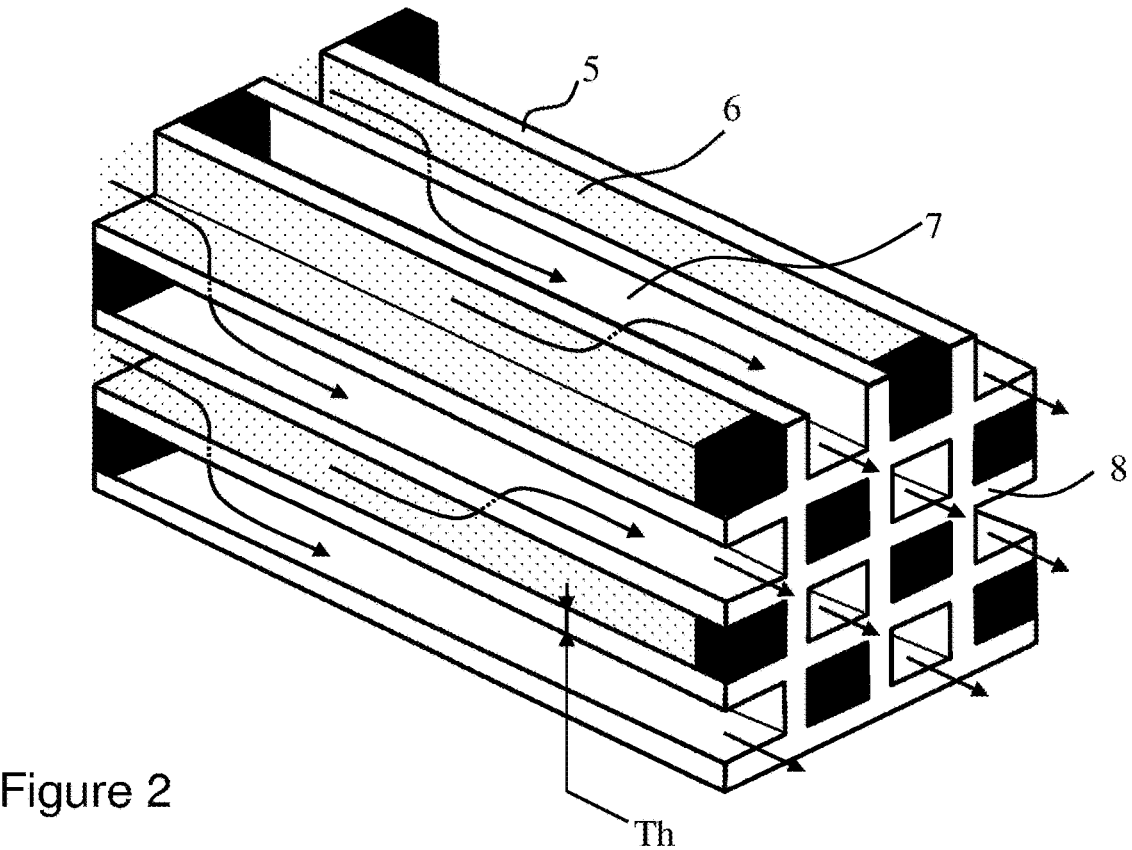
FIG. 2 is a partial schematic view of the honeycomb structure of a porous substrate 5 of a selective catalytic reduction filter 1 and corresponds to detail A of FIG. 1a FIG. 3 represents a schematic section view of a porous wall 8 forming partition wall of a porous substrate 5 such as represented on FIGS. 1 and 2.

The porous substrate 5 can show various forms or shapes. In the example of FIGS. 1a, 1b and 2 and as described herein, the porous substrate 5 has a honeycomb structure having a globally circular form and comprising upstream channels 6 and downstream channels 7. Upstream channels 6 and downstream channels 7 are separated by porous partition walls 8. The honeycomb structure such as represented on FIGS. 1a, 1b and 2 can be obtained by extrusion of a sintered ceramic or sintered metal alloy among those previously listed.

The porous substrate 5 can adopt some other general forms such as, for instance: trapezoidal forms, rectangular forms, square forms, sinusoidal forms, hexagonal forms, oval forms. Instead of a honeycomb structure or monolith structure, the porous substrate can have some other structural form, such as packed fibres, open cell foams, blocks of sintered metal alloy, blocks of sintered carbon.

The porous partition walls 8 are preferably thin walls; that means that they have a thickness that is higher than 0.05 mm. In the field of treatment of exhaust gases emitted by an engine in an automotive vehicle, the porous partition walls 8 have preferably a thickness comprised between 0.05 and 0.5 mm for an optimal compromise between backpressure, mechanical strength, filtration and catalytic capacities.

The porous substrate 5 used for manufacturing the reactive filter 1 according to the invention can notably be defined by its intrinsic porosity. The intrinsic porosity of the porous substrate 5 according to the invention is defined by the total volume of its pores free of any material, in particular free of any catalytic zeolite material, divided by the external volume of the porous substrate. The intrinsic porosity of a particular porous substrate 5 is thus a feature that is defined independently from its use, in particular independently from its in situ coating with the catalytic zeolite material generated by hydrothermal synthesis according to the invention.

Preferably, the porous substrate 5 has an intrinsic porosity, that is to say before coating, comprised between 5 and 90%, if the reactive filter is a selective catalytic reduction filter to treat exhaust gas emitted by a vehicle engine, such as those emitted by a diesel engine the porous substrate has preferably an intrinsic porous comprised between 30 and 70% or between 55 and 65%.

In vehicle engine applications, due to exhaust gas pressures and also to vehicle and engine vibrations, an intrinsic porosity of the porous substrate greater than 70% can compromise the resistance strength of the selective catalytic reduction filter such as mounted in the vehicle. An intrinsic porosity lower than 30%, will result in too high backpressure in the exhaust line of the vehicle.

The porous substrate can also be defined by the intrinsic mean size of the internal pores 11 of the porous substrate 5. The intrinsic mean size of the pores is defined for a porous substrate that is free of any material, in particular free of any catalytic zeolite material.

Preferably, the intrinsic mean pore size is comprised between 0.1 and 100 μm, preferably if the reactive filter is a selective catalytic reduction filter to treat exhaust gas emitted by a vehicle engine, such as those emitted by a diesel engine, the intrinsic mean pore size is preferably comprised between 1 and 30 μm and more preferably, the intrinsic mean pore size is comprised between 5 and 25 μm. The intrinsic mean pore size can be notably of 12, 13, 14 or 15 μm.

Further to the in situ hydrothermal synthesis resulting in the presence of the catalytic zeolite material directly on the inner surface 12 of the internal pores 11 of the porous substrate 11, the mean size of the coated pores 11 will be reduced.

Therefore, the coated internal pores 11 of the porous substrate 5 have a mean pore size diameter that is lower than the mean pore size diameter within the raw substrate and that is determined by filtration requirements such as the size of the particles that have to be trapped by the reactive filter 1.

Preferably, the mean size of the coated pores of the porous substrate 5 is reduced by 5 to 50%, preferably by 5 to 30%, compared to the intrinsic mean pore size of the porous substrate 5. Advantageously, the coated pores 11 of the porous substrate 5 have a mean pore size comprised between 0.1 and 100 μm, if the reactive filter is a selective catalytic reduction filter to treat exhaust gas emitted by a vehicle engine, such as those emitted by a diesel engine, the mean pore sized is comprised between 1 and 30 μm, more preferably between 3 and 25 μm.

For the reactive filter 1 according to the invention, the catalytic zeolite material 10 results from an in situ hydrothermal synthesis around the grain structure 13 of the porous substrate 5. In other words, the catalytic zeolite material 10 coating the inner surface 12 of the internal pores 11 of the porous substrate 5 is generated in situ. Therefore, the catalytic zeolite material 10 generated by in situ hydrothermal synthesis is thus directly formed on the inner surface 12 of the internal pores 11 of the porous substrate 5.

More precisely, the synthesis of this catalytic zeolite material 10 is carried out in the presence of the porous substrate 5, thus allowing its growing directly in contact of the inner surface of the pores of the porous substrate. An initial structure of the porous substrate 5, that is to say before coating, is represented on FIG. 4a. A porous substrate 5 of a reactive filter 1 according to the invention that is coated with a catalytic zeolite material 10 is represented on FIG. 4c.

The catalytic zeolite material is prepared starting from reagents that are useful in the preparation of such a catalytic zeolite material. Generally, the starting reagents are selected within the zeolite precursors compounds known in the preparation of zeolite materials, for example in the group consisting of silicon precursors such as silicone oxide; aluminium precursors such as aluminium hydroxide, aluminium oxide; phosphorus precursors such as phosphoric acid; iron-aluminium oxide precursors. Preferably, a zeolite structure template agent is also used in combination with zeolite precursors to prepare a zeolite material. Such a zeolite structure template agent is preferably selected from tetraalkylated ammonium hydroxides, notably from tetraethylammonium hydroxide and tetrapropylammonium hydroxide. Solutions of such compounds are preferably used for the preparation of the filter according to the invention.

In order to render active the zeolite material and therefore in order to obtain a catalytic zeolite material, at least one active catalytic species precursor is mixed with zeolite precursors and zeolite template agent when the latter is used.

If the reactive filter 1 according to the invention is a selective catalytic reduction filter, said at least one active species precursor can be selected in the groups consisting of Cu precursors such as copper nitrate; Fe precursors such as iron nitrate; ceria precursors; a precious metal precursors such as Ag and Rh, or combinations thereof.

In case Cu, Fe or ceria is present in the filter according to the invention, the filter can be implemented in the presence of ammoniac, in particular in the presence of an aqueous solution of ammoniac. In case a precious metal, notably Ag and Rh, is present in the filter according to the invention, the filter can be implemented in the presence of at least one hydrocarbon compound.

If the reactive filter 1 according to the invention is an oxidative reaction filter, said at least one active species precursor can be selected in the groups consisting of Ce precursors, Fe precursors, Pt precursors, Pd precursors, Mn precursors, or combinations thereof.

The catalytic zeolite material can be obtained from a combination of different active precursors or zeolite precursors which are mixed, before conducting the in situ hydrothermal synthesis, in a medium also containing water.

Advantageously, the medium comprising water, at least one zeolite material precursor derivative, at least one active catalytic species precursor and at least one zeolite structure template agent or at least one zeolite structure directing agent, has a viscosity that is lower than the inducing gel formation viscosity at ambient temperature that is lower than the inducing gel formation viscosity. At the temperature where is conducted the in situ hydrothermal synthesis, that is to say between 160 and 250° C., the viscosity of the medium decreases to become close or inferior to the viscosity of water.

By contacting a porous substrate 5 as described herein with a medium also as described herein, the catalytic zeolite material 10 resulting from the in situ hydrothermal synthesis allows the inner surface 12 of the internal pores 11 to be directly coated in a homogeneous manner, by this catalytic zeolite material 10 in the absence of any binding substance.

By "homogeneous manner", it is understood that the coated pores 11 of the porous substrate 5 have from 80 to 100% and preferably from 90 to 100% of their inner surface 12 that is coated with the catalytic zeolite material 10.

Figure 6A:
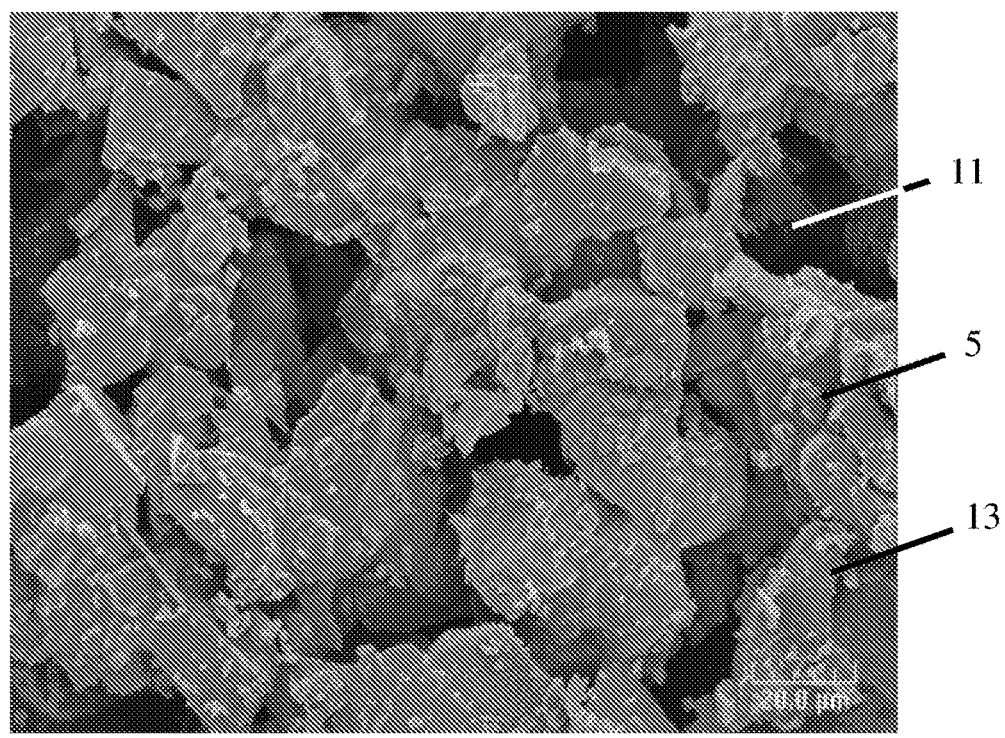
FIG. 6a is an image obtained by Scanning Electron Microscope (SEM) and showing a crystallographic structure a porous substrate before coating with a catalytic zeolite material.

FIG. 6a is an image obtained by Scanning Electron Microscope (SEM). FIG. 6a shows a crystallographic structure of a porous substrate before coating with a catalytic zeolite material. The scale of representation has been chosen such that 1 cm on FIG. 6a represents approximately 20 μm in the porous substrate structure.

Figure 6B:
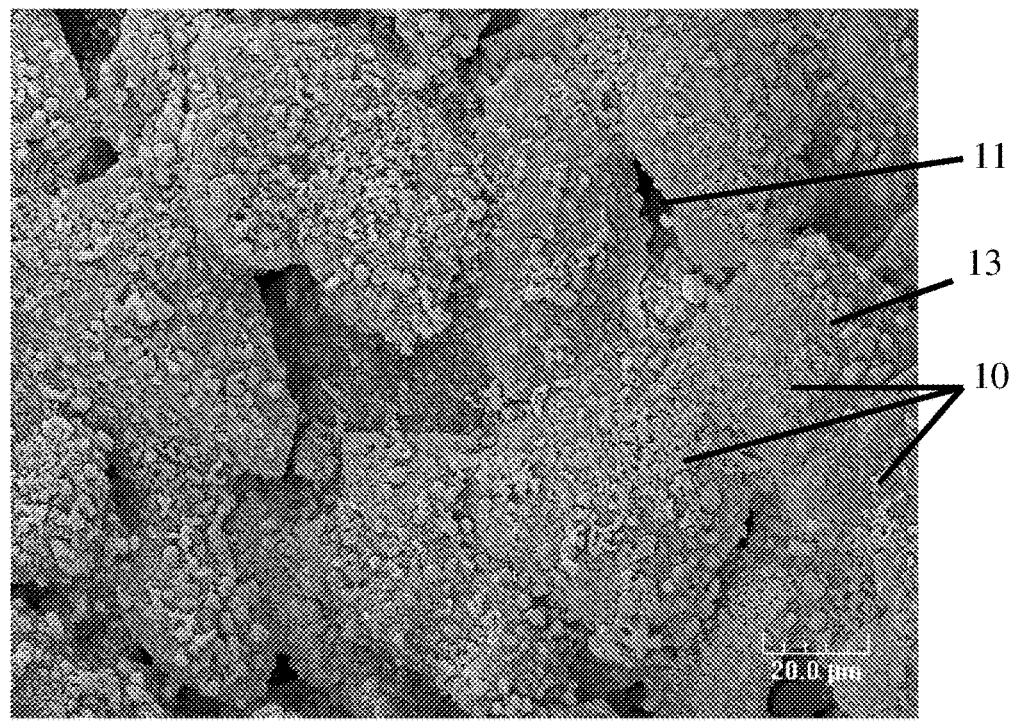
FIG. 6b is an image corresponding to the one represented on FIG. 6a wherein the porous substrate has been coated with catalytic zeolite material 10 according to the preparation process of the invention.

FIG. 6b is an image, at a different location from the porous substrate structure represented on FIG. 6a and showing the porous substrate structure coated with a catalytic zeolite material 10 according to the preparation process of the invention. The zeolite that has been synthesised, by in situ hydrothermal synthesis, on the surface 12 of the grain structure 13, is of the MFI type. More precisely, it is a ZSM-5 zeolite with a Si/Al molecular ratio that is about 37.5.

FIG. 6b shows that the catalytic zeolite material 10 resulting from an in situ hydrothermal synthesis is formed around the grain structure 13 in a homogenous manner without clogging the pores 11 of the porous substrate structure of FIG. 6a.

Figure 3:
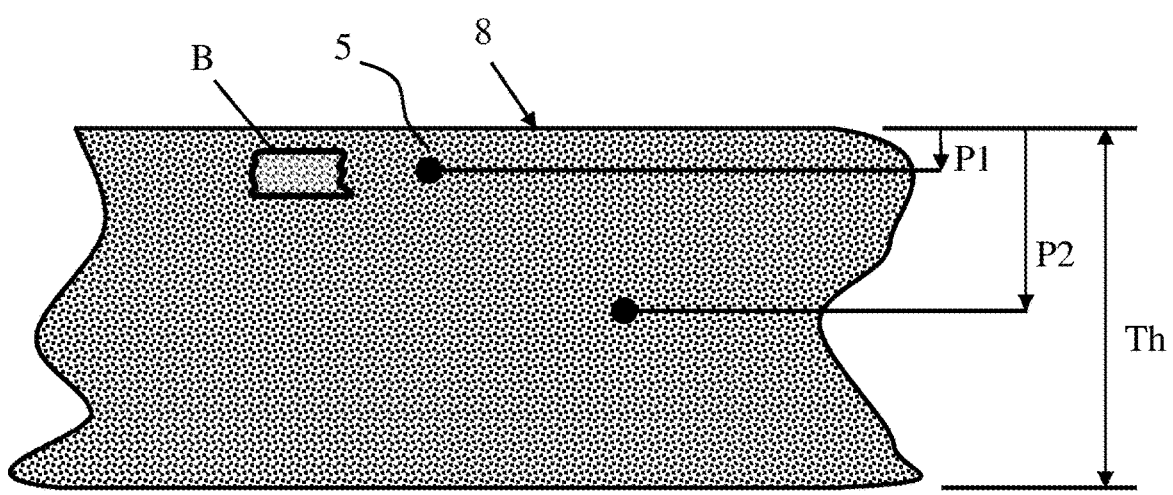

Furthermore, thanks to the invention, in a porous substrate 5 comprising at least one porous wall 8, such as represented on FIG. 3, having internal pores 11 whose inner surfaces 12 are, totally or partially, directly coated by a catalytic zeolite material 10 resulting from an in situ hydrothermal synthesis, the mean size of the coated pores 11 can be homogenously distributed over the thickness (Th) of the porous wall 8 in such a way that differences of mean sizes of the coated internal pores 11 is lower than 15%, preferably lower than 5%, between two different depths P1, P2 of determination of the pore mean sizes in the porous wall 8 (see FIG. 3). Determination of pore mean sizes is, for instance, carried out by mapping analysis using Scanning electron microscopy.

A further advantage resulting from the generation of a catalytic zeolite material 10 by in situ hydrothermal synthesis in a porous substrate 5 comprising at least one porous wall 8 having internal pores 11 whose inner surfaces 12 are, totally or partially, directly coated by the catalytic zeolite material 10, is that the catalytic zeolite material 10 can be homogeneously distributed over the thickness (Th) of said porous wall 8 in such a way that differences in term of inner surface areas of the internal pores that are coated by the catalytic zeolite material are lower than 15%, preferably lower than 5%, between two different depths P1, P2 of determination of the inner surface areas that are coated in said porous wall 8 (see FIG. 3). Determination of inner surface areas that are coated is, for instance, determined by mapping analysis using Scanning electron microscopy.

When the reactive filter is a selective catalytic reduction filter to treat exhaust gas emitted by a vehicle engine, such as those emitted by a diesel engine, said porous wall 8 has preferably a thickness that is comprised between 0.05 and 0.5 mm.

Figure 7A:
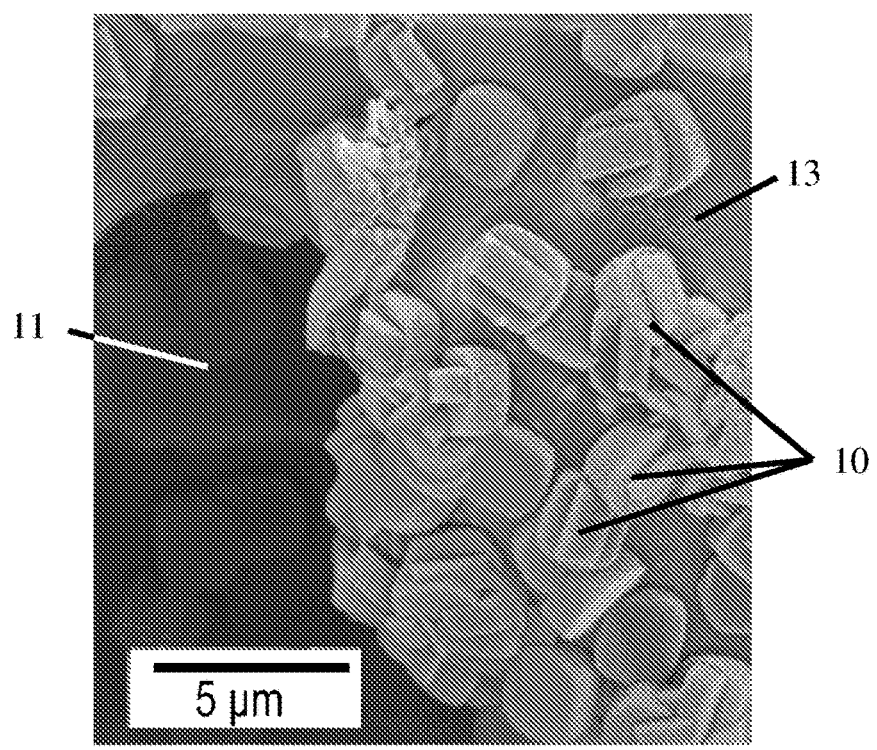
FIG. 7a is an image obtained by Scanning Electron Microscope (SEM) and showing a first crystallographic structure at a first depth (FIG. 6a) in a porous wall forming partition wall of a porous substrate prepared according to the preparation process of the invention.

FIG. 7a is an image obtained by Scanning Electron Microscope (SEM) and showing a first crystallographic structure at a first depth P1 (FIG. 3) in a porous wall 8 forming partition wall of a porous substrate prepared according to the preparation process of the invention. More precisely, the first depth P1 is closed to the surface of said porous wall 8.

Figure 7B:
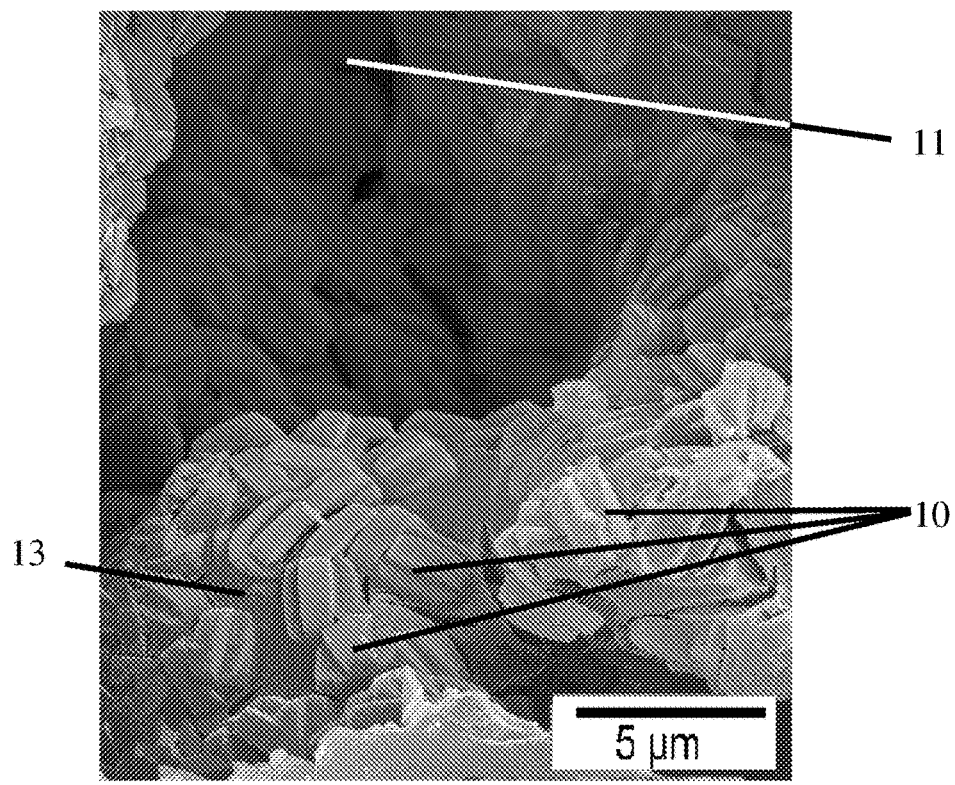
FIG. 7b is another image obtained by Scanning Electron Microscope (SEM) and showing a second crystallographic structure at a second depth in the same porous wall from which is obtained for the first crystallographic structure.

FIG. 7b is another image obtained by Scanning Electron Microscope (SEM) and showing a second crystallographic structure at a second depth P2 (FIG. 3) of the same porous wall from which is obtained the first crystallographic structure. More precisely, the second depth P2 corresponds approximately to half of the thickness of said porous wall 8

FIGS. 7a, 7b are also used, in addition of FIG. 6b, to show that the catalytic zeolite material 10, that is of MFI type, resulting from an in situ hydrothermal synthesis is homogeneously distributed around the grain structure 13.

A comparison of FIGS. 7a and 7b also shows that thanks to the invention the catalytic zeolite material 10 is homogeneously distributed over the thickness (Th) of said porous wall.

Figure 8A:
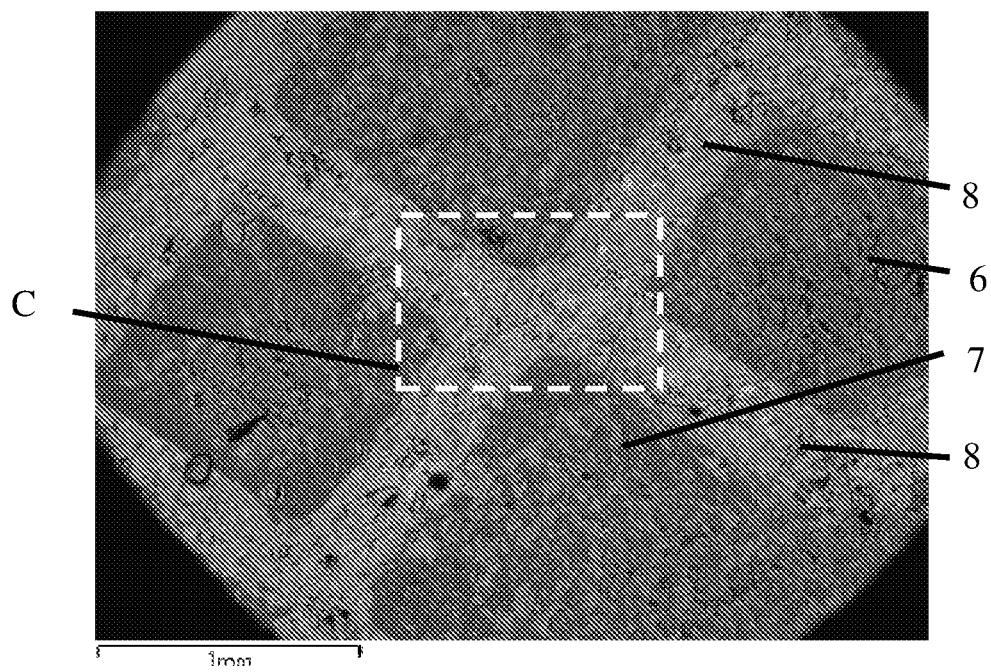
FIG. 8a represents a partial cross-section of a porous substrate.

FIG. 8a represents a partial cross-section of a silicon carbide porous substrate 5 coated with a catalytic zeolite material 10 of the MFI Zeolite type, resulting from an in situ hydrothermal synthesis. More precisely, FIG. 8a represents four channels 6, 7 separated by porous walls 8.

Figure 8B:
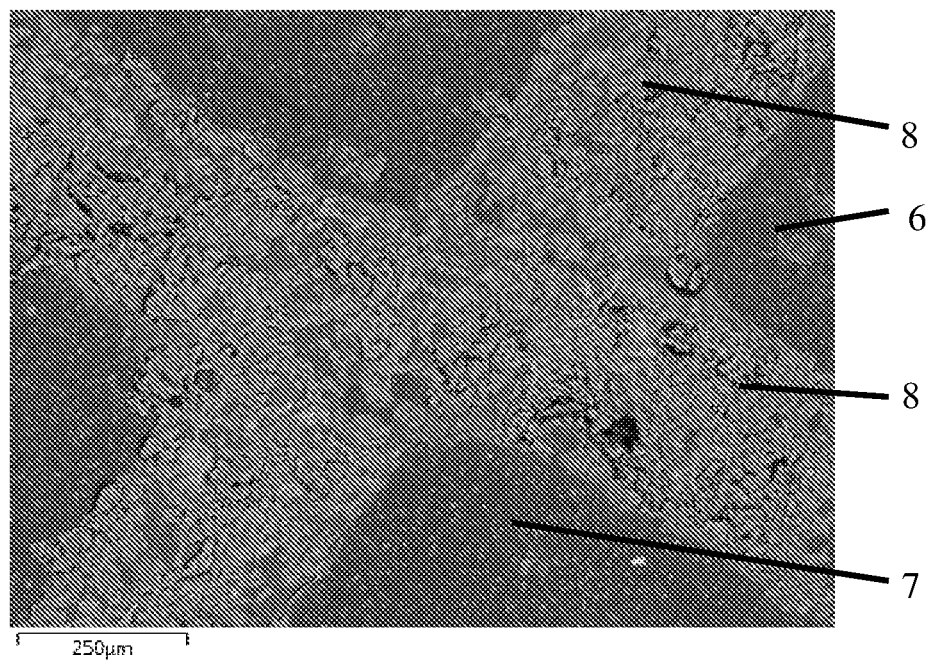

FIG. 8b represents a zoom magnification of detail C on FIG. 8a.

Figure 9A:
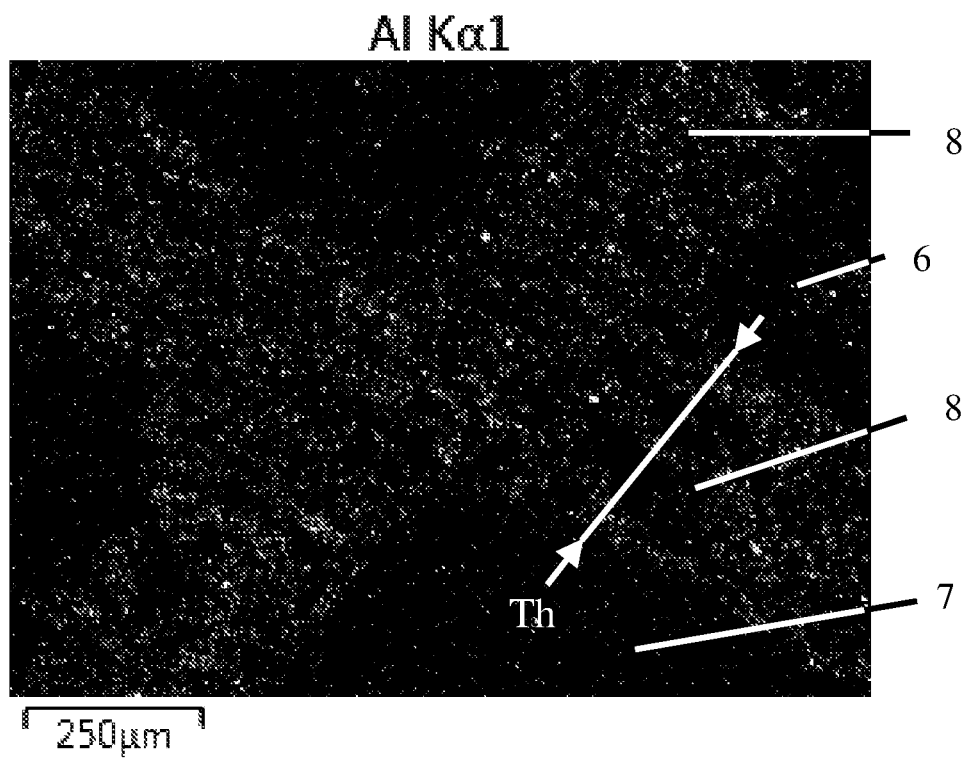
FIG. 9a represents a zoom magnification of detail C on FIG. 8a using an Al developer.

FIG. 9a represents a zoom magnification of detail C on FIG. 8a wherein an Al developer has been used to develop the presence of Al components identified by white spots.

Figure 9B:
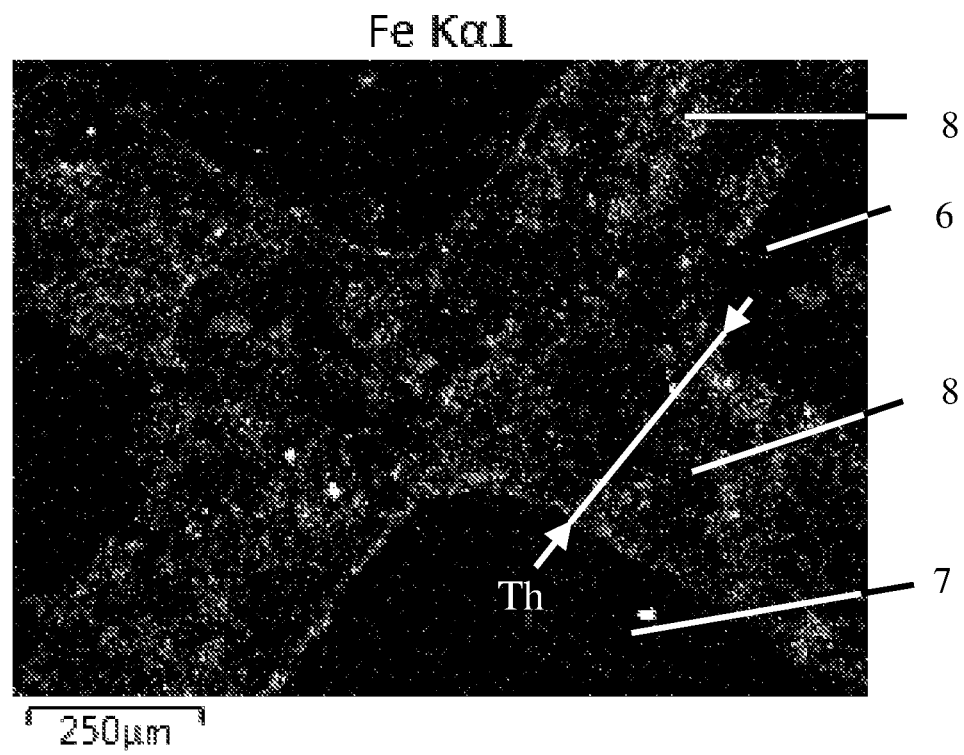
FIG. 9b represents a zoom magnification of detail C on FIG. 8a using a Fe developer.

FIG. 9b represents a zoom magnification of detail C on FIG. 8a wherein a Fe developer has been used to develop the presence of Fe components identified by white spots.

Since the catalytic zeolite material comprises Al and Fe, white spots on FIGS. 9a and 9b show a homogenous distribution of the catalytic zeolite material over the thickness (Th) of the porous wall 8.

Thanks to the homogenous coating of the catalytic zeolite material 10 on the inner surfaces 12 of the internal pores 11, the selective catalytic reduction effect or oxidative reaction effect can be increased compared to the prior art without significant detrimental effect on the capacity and efficiency on the filtration of particles.

The reactive filter 1 according to the invention has a porosity allowing the exhaust gases entering into the reactive filter 1, via main inlet 23 of the filter 1, to be filtered and be evacuated through the main outlet 24 of the engine depolluting system 20. The porosity of the reactive filter 1 according to the invention, more precisely the porosity of the porous substrate 5 of the reactive filter 1 according to the invention, can thus be defined by its function. The reactive filter 1 has thus a porosity allowing such a property. The porosity of the reactive filter 1 can also be defined by structural features of the reactive filter. The porosity can thus be defined as the ratio of the total volume of the voids or internal pores 11 of the porous substrate 5 to the total inner volume of the porous substrate.

Preferably, the porous substrate 5 of the reactive filter 1 according to the invention has a porosity when coated with catalytic zeolite material, that is comprised between 5 and 90%; if the reactive filter is a selective catalytic reduction filter to treat exhaust gas emitted by a vehicle engine, the porosity is preferably comprised between 30 and 70%, more preferably between 50 and 65%.

Depending on the conditions of the in situ hydrothermal synthesis, preferably performed in an autoclave reactor, the amount of catalytic zeolite material 10 or its coating thickness can be controlled. Preferably, the amount of catalytic zeolite material 10 or its coating thickness results from the choice of the zeolite precursors, from the temperature and/or the duration of the synthesis reaction.

Advantageously, the reactive filter 1 according to the invention has a defined selective catalytic reduction capacity and efficiency or a defined oxidative reaction capacity and efficiency. Preferably, for a given volume of porous substrate 5, these reactive capacity and efficiency are controlled depending on the amount of catalytic zeolite material coating resulting from the in situ hydrothermal synthesis. The reactive capacity and efficiency for a given volume of porous substrate 5, can also be controlled depending on the thickness of the catalytic zeolite material coating 10 resulting from the in situ hydrothermal synthesis. Thanks to the invention, an optimal selective catalytic reduction capacity and efficiency can be obtained by using 50 to 100 g and preferably 10 to 20 g of catalytic zeolite material per litre of porous substrate 5 without significant detrimental effect on the capacity or on the efficiency of filtration of particles.

The filtering efficiency in retaining engine particulates, in particular diesel engine particulates, is mainly dependent on the mean pore size of the coated porous substrate 5 such as represented on FIG. 4c. FIG. 4c corresponds to detail B of FIG. 2. Depending on the initial mean pore size of the intrinsic porous substrate 5, the thickness of the catalytic zeolite material coating 10 on the inner surfaces 12 of the internal pores 11 and resulting from the in situ hydrothermal synthesis, is determined to obtain the desired mean pore size in the coated porous substrate 5 and therefore a desired filtering efficiency. The thickness of the catalytic zeolite material coating 10 on the inner surfaces 12 of the internal pores 11 is controlled by selecting the zeolite precursor composition and by determining conditions under which the in situ hydrothermal synthesis is conducted, notably the temperature, the duration of the synthesis reaction and advantageously the pressure.

Depending notably on the choice of the zeolite precursors, the porous substrate 5 used in the reactive filter 1 according to the invention can be coated with a large variety of catalytic zeolite materials. The zeolite precursors such as, for instance, mentioned herein can be used to realize zeolite materials that once activated will form catalytic zeolite materials. Notably, the zeolite materials can be selected in the group consisting of:

FAU zeolites such as: faujasite zeolites, X zeolites, Y zeolites;
MFI zeolites: ZSM-5 zeolites, ZSM-11 zeolites, ZSM-22 zeolites, ZSM-23 zeolites, ZSM-48 zeolites, ZSM-12 zeolites;
BEA zeolites such as: β zeolites;
Zeolites A such as: NaA zeolites, CaA zeolites;
CHA zeolites such as: SAPO zeolites, MeAPO zeolites, MeSAPO zeolites, and, for instance, among SAPO zeolites it can be a SAPO-34, SSZ-13;
LTL zeolites such as L zeolites.

In order to be rendered active and therefore to obtain a catalytic zeolite material, the zeolite material is activated by using at least one active catalytic species precursor that can be one of those defined herein as examples. The active catalytic species precursor is mixed into the medium before conducting the in situ hydrothermal synthesis.

Generally, the catalytic zeolite material is capable of acting as a catalyst for chemical reactions allowing degrading an exhaust substance, in particular originating from an engine, notably originating from a diesel engine.

Preferably, the zeolite is capable of acting as a catalyst in an engine exhaust depolluting system, in particular in an engine exhaust depolluting system for diesel engine vehicles. More preferably, the zeolite is capable of acting as a catalyst of a selective catalytic reduction reaction or of an oxidative reaction.

In the aim of preparing a selective catalytic reduction filter wherein the catalyst property of the zeolite is implemented, a particularly preferred zeolite material is selected from ZSM-5 zeolite, β zeolite, SSZ-13 zeolite, SAPO-34 zeolite, faujasite zeolite or L zeolite.

The catalytic zeolite material 10 of the reactive filter 1 according to the invention can include at least one further substance, in particular at least one further catalytic substance such as Fe or Cu. The further substance can be introduced during the in situ hydrothermal synthesis of the zeolite material.

The reactive filter 1 according to the invention comprises a porous substrate 5 comprising internal pores 11. These internal pores 11 have their inner surfaces 12, totally or partially, directly coated with a catalytic zeolite material 10. For the reactive filter according to the invention, the catalytic zeolite material results from an in situ hydrothermal synthesis.

The invention also provides a process for the preparation of a reactive filter 1 according to the invention.

Figure 5:
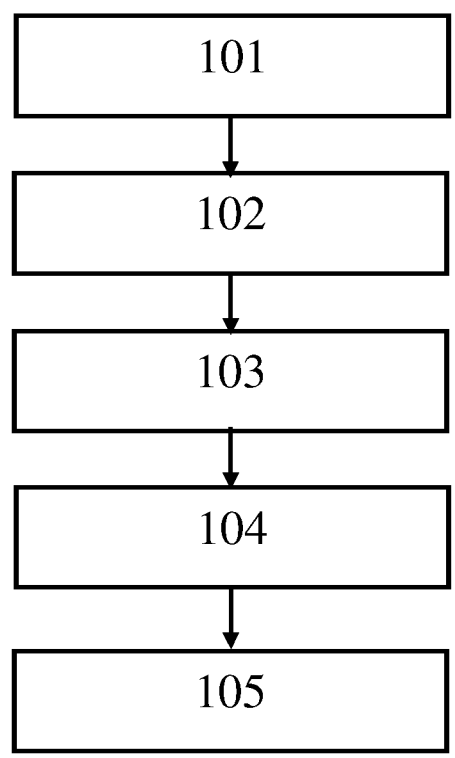
FIG. 5 is a flow chart illustrating the main steps of a process for preparing a reactive filter according to the invention.

The process according to the invention thus allows preparing a reactive filter 1 selected from a selective catalytic reduction filter and an oxidative reaction filter. In this case, the reactive filter 1 comprises a porous substrate 5 that has a particulate filtering function and a catalytic reduction function or an oxidative reaction function, and that comprises internal pores 11 having their inner surface 12, totally or partially, directly coated with a catalytic zeolite material 10 resulting from an in situ hydrothermal synthesis. The process according to the invention, such as represented on FIG. 5, is characterized in that it comprises the following steps:

a) preparing at step 101 a medium comprising water, at least one zeolite material precursor derivative and at least one active catalytic species precursor;

b) providing at step 102 a porous substrate 5 having an intrinsic porosity comprised between 5 and 90%, preferably between 30 and 70% when the reactive filter is a selective catalytic reduction filter to treat exhaust gas emitted by a vehicle engine, such as those emitted by a diesel engine, and more preferably between 55 and 65%; and an intrinsic mean pore size comprised between 0.1 and 100 µm, preferably between 1 and 30 µm when the reactive filter is a selective catalytic reduction filter to treat exhaust gas emitted by a vehicle engine, such as those emitted by a diesel engine, more preferably between 5 and 25 µm;

c) contacting at step 103 the porous substrate 5 provided at step 102 with the medium prepared at step 101;

d) conducting at step 104 a hydrothermal synthesis in an autoclave reactor wherein the temperature is comprised between 160 and 250° C. and during 30 min to 10 days;

e) eliminating at step 105 the zeolite structure template agent or the zeolite structure directing agent by a heating treatment at a temperature comprised between 100 and 1200° C., preferably between 160 and 850° C. in the presence of oxygen and in the presence of an inert gas such as nitrogen.

More precisely, it is the internal surfaces 12 of internal pores 11 of the porous substrate 5 that are contacted by the medium during step 103. Preferably, step 103 consists in immersing the porous substrate 5 in a bath containing the medium. And preferably during at least the beginning of step 104, the porous substrate 5 remains immersed in the bath containing the medium.

Preferably, the medium prepared according to step 101 further comprises at least one zeolite structure template agent or at least one zeolite structure directing agent.

Preferably, the medium prepared according to the process of the invention comprising water, at least one zeolite material precursor derivative, at least one active catalytic species precursor and at least one zeolite structure template agent or at least one zeolite structure directing agent, has a viscosity that is lower than the inducing gel formation viscosity. At the temperature where is conducted the in situ hydrothermal synthesis, that is to say between 160 and 250° C., viscosity of the medium decreases to become close or inferior to the viscosity of water.

As a consequence, the prepared medium contacted with a porous substrate 5 is capable of leaking or flooding the internal porous structure of the porous substrate 5 through its entire thickness during the hydrothermal synthesis, notably through the internal pores 11 of the porous substrate 5. The zeolite precursors can thus directly get into contact with the grains 13 or materials of the internal porous structure of the porous substrate 5 thus allowing the presence of the resulting zeolite material directly on the inner surfaces 12 of the internal pores 11 of the porous substrate 5 further to the in situ hydrothermal synthesis.

Also preferably, the zeolite material precursor according to the process of the invention is selected in the group consisting of silicon precursors such as silicone oxide; aluminium precursors such as aluminium hydroxide, aluminium oxide; phosphorus precursors such as phosphoric acid; iron-aluminium oxide precursors and mixtures thereof.

For the process according to the invention, the zeolite structure template agent or the zeolite structure directing agent is preferably selected from weak bases and bases having a pH that is superior than 7.

The zeolite structure template agent or the zeolite structure directing agent is preferably present as a solution.

Also preferably, the zeolite structure template agent or the zeolite structure directing agent is selected from tetraalkylated ammonium hydroxides, notably from tetraethylammonium hydroxide and tetrapropylammonium hydroxide.

For the process according to the invention, the medium can further comprise at least one catalytic substance or at least one metal catalyst.

Further to its preparation, the medium comprising water, at least one zeolite material precursor derivative and at least one zeolite structure template agent or at least one zeolite structure directing agent, can be aged. Preferably, the prepared medium is aged during a period lasting from a few minutes to several weeks. More preferably, aging of the prepared medium lasts from 30 minutes to 10 days.

The process according to the invention allows controlling the in situ hydrothermal synthesis of the catalytic zeolite material into the porous substrate 5 of the reactive filter 1 according to the invention.

The process according to the invention allows controlling the coating of the inner surfaces 12 of the internal pores 11 of the porous substrate 5. The inner surfaces 12 of the internal pores 11 can thus be totally or partially coated with the catalytic zeolite material that is generated in situ by hydrothermal synthesis. The process also allows controlling the amount of catalytic zeolite material that is synthetized in situ.

Various features of the process according to the invention can be tailored in this respect. These properties can be controlled by a particular selection of the porous substrate 5, by the temperature and duration of the hydrothermal synthesis, by the type of zeolite precursor derivatives or by the type and amount of zeolite structure template agent or zeolite structure directing agent.

For instance, the temperature and the duration at which is conducted the in situ hydrothermal synthesis are adjusted depending on the thickness of the catalytic zeolite material 10 that it is desired to be formed on the inner surfaces 12 of the internal pores 11 and/or depending on the mean pore size that it is desired to be obtained in the reactive filter 1. The desired mean pore size can, for instance, be determined depending on the size of the particles to trap to ensure filtration function.

Therefore, during the process according to the invention, the porosity of the porous substrate 5 comprising the catalytic zeolite material 10 synthetized in situ is reduced. For the process according to the invention, the mean size of the coated internal pores 11 of the porous substrate 5 can be reduced by 5 to 50%, more preferably by 10 to 30%, with respect to the intrinsic mean pore size of the porous substrate.

Preferably, for the process according to the invention the amount of catalytic zeolite material synthetized in situ is such that the resulting porosity of porous substrate 5 in the reactive filter 1 is comprised between 5 and 90%. More preferably, the resulting porosity is comprised between 30 and 70%, and more preferably between 50 and 65%.

During the in situ hydrothermal synthesis, the pressure built up in the autoclave reactor. This increase is mainly due to the increase of the temperature in the autoclave reactor. In a variation of the preparation process according to the invention, the pressure inside the autoclave reactor can also be controlled in order to accelerate and/or increase the efficiency of the in situ hydrothermal synthesis reaction.

The invention provides a reactive filter 1 and a process for its preparation. The invention also relates to the use of the reactive filter 1 according to the invention. In particular, the invention also provides an engine exhaust depolluting system, preferably a diesel engine exhaust depolluting system, characterized in that it comprises at least one reactive filter 1 according to the invention.

The engine exhaust depolluting system according to the invention can be used solely or in combination with one or more apparatus useful in the treatment or in depolluting an exhaust, notably an exhaust originating from an engine.

Preferably, the invention provides an engine exhaust depolluting system 20 wherein a reactive filter according to the invention is combined with an oxidation catalytic unit, preferably a diesel oxidation catalytic unit (DOC unit).

Also preferably, the invention provides an engine exhaust depolluting system wherein a filter according to the invention is combined with an oxidation catalytic unit, preferably a diesel oxidation catalytic unit (DOC unit), and with a selective catalytic reduction unit (SCR unit).

The invention also provides an automotive vehicle, preferably a diesel automotive vehicle comprising a reactive filter according to the invention or comprising an engine exhaust depolluting system 20 according to the invention. Preferably, the automotive vehicle comprises a selective catalytic reduction filter according to the invention. The automotive vehicle is preferably a diesel automotive vehicle.

The particular, advantageous and preferred features defined for the reactive filter according to the invention provides corresponding particular, advantageous and preferred engine exhaust depolluting system and automotive vehicle according to the invention.

The invention claimed is:

1. A selective catalytic reduction filter comprising:
   a porous substrate having a particulate filter function and a catalytic reduction function, the porous substrate having an intrinsic porosity comprised by 5% and 90% and an intrinsic mean pore size comprised between 0.1 pm and 100 pm, the porous substrate comprising internal pores each having an inner surface, totally or partially, directly coated with a catalytic zeolite material resulting from an in situ hydrothermal synthesis conducted inside an autoclave reactor, in which the porous substrate is contacted with a medium comprising water, at least one zeolite material precursor derivative, at least one active catalytic species precursor, and at least one zeolite structure template agent,
   wherein the inner surfaces of the internal pores are directly coated homogenously by the catalytic zeolite material in an absence of a binding substance, and
   wherein the selective catalytic reduction filter is configured to treat exhaust gas emitted by a vehicle diesel engine.

2. The selective catalytic reduction filter according to claim 1, wherein the porous substrate is selected from the group consisting of:
   ceramic-like materials, ceramic materials,
   cordierite ceramic, a-alumina, silicon carbide, aluminium titanate, silicon nitride, zirconia, mullite, spodumene, alumina-silica-magnesia, zirconium silicate,
   one or more metal alloys, metal alloys, sintered metals, porous refractory metals,
   titanium oxide, aluminium, iron, steel, sintered carbon, and
   stainless steel, iron alloys, nickel alloys, chromium alloys, aluminium alloys, titanium alloys.

3. The selective catalytic reduction filter according to claim 1, wherein the porous substrate is in a form selected from trapezoidal forms, rectangular forms, square forms, sinusoidal forms, hexagonal forms, oval forms, a honeycomb structure, a monolith structure, packed fibres, open cell foams, blocks of sintered metal alloy, and blocks of sintered carbon.

4. The selective catalytic reduction filter according to claim 1, wherein the porous substrate comprises at least one porous wall having the internal pores having the inner surfaces, totally or partially, directly coated by the catalytic zeolite material resulting from the in situ hydrothermal synthesis,
   wherein a mean size of the coated internal pores is homogeneously distributed over a thickness of said porous wall, and/or
   the catalytic zeolite material is homogeneously distributed over the thickness of said porous wall in such a way that differences of mean sizes of the coated internal pores is lower than 15% between two difference depths of determination of pore mean sizes in said porous wall.

5. The selective catalytic reduction filter according to claim 4, wherein said at least one porous wall has a thickness that is comprised between 0.05 and 0.5 mm.

6. The selective catalytic reduction filter according to claim 1, wherein
   the internal pores of the coated porous substrate have from 80 to 100% of the inner surfaces that are coated with the catalytic zeolite material, and/or
   the catalytic zeolite material results from the in situ hydrothermal synthesis around a grain structure of the porous substrate.

7. The selective catalytic reduction filter according to claim 1, wherein the amount of catalytic zeolite material or a coating thickness thereof results from the conditions of the in situ hydrothermal synthesis.

8. The selective catalytic reduction filter according to claim 1, wherein the coated internal pores of the porous substrate have a mean pore size diameter that is lower than the mean pore size diameter within the raw substrate before coating and that is determined by filtration requirements.

9. The selective catalytic reduction filter according to claim 1, wherein the catalytic zeolite material is realized from a material zeolite selected in the group consisting of:
FAU zeolites,
MFI zeolites,
BEA zeolites,
Zeolites A,
CHA zeolites, and
LTL zeolites.

10. The selective catalytic reduction filter according to claim 9, wherein the catalytic zeolite material is also realized from at least one active species precursor.

11. The selective catalytic reduction filter according to claim 1, wherein the selective catalytic reduction filter has a defined filtering efficiency in retaining engine particulates that is obtained by controlling a thickness of the catalytic zeolite material coating internal pores, and
wherein the thickness of the catalytic zeolite material coating internal pores is controlled by selecting a composition of the zeolite material precursor derivative, and by determining conditions of the in situ hydrothermal synthesis.

12. The selective catalytic reduction filter according to claim 1, wherein the selective catalytic reduction filter is highly selective in lowering $N_2O$ by reduction reactions.

13. A process for preparing the selective catalytic reduction filter according to claim 1, the process comprising:
preparing the medium comprising the water, the at least one zeolite material precursor derivative, the at least one active catalytic species precursor, and the at least one zeolite structure template agent or at least one zeolite structure directing agent;
providing the porous substrate having the intrinsic porosity comprised between 5% and 90% and the intrinsic mean pore size comprised between 0.1 µm and 100 µm;
contacting the provided porous substrate with the prepared medium;
conducting the in situ hydrothermal synthesis in the autoclave reactor in which the temperature is comprised between 160° C. and 250° C. and the duration of 30 min to 10 days; and
eliminating the zeolite structure template agent or the zeolite structure directing agent by a heating treatment at a temperature comprised between 100° C. and 1200° C. in a presence of oxygen and in a presence of an inert gas.

14. The process according to claim 13, wherein the porous substrate comprises the internal pores having the internal surfaces contacted by the prepared medium.

15. The process according to claim 13, wherein the contacting of the provided porous substrate with the prepared medium comprises immersing the porous substrate in a bath containing the medium.

16. The process according to claim 13, wherein, during the conducting the in situ hydrothermal synthesis, the temperature and the duration at which the in situ hydrothermal synthesis is conducted, are adjusted depending on one or more of the thickness of the catalytic zeolite material desired to form at the inner surfaces of the internal pores, and/or the mean pore size that is desired to be obtained in the selective catalytic reduction filter.

17. The process according to claim 16, wherein the desired mean pore size is determined depending on the size of the particles to trap.

18. The process according to claim 13, wherein one of:
the medium comprising the water, the at least one zeolite material precursor derivative, the at least one active catalytic species precursor, and the at least one zeolite structure template agent or the at least one zeolite structure directing agent, has a viscosity that is lower than an inducing gel formation viscosity,
the at least one zeolite material precursor derivative is selected from a group consisting of silicon precursors, aluminium precursors, phosphor precursors, iron aluminium oxide precursors, and mixtures thereof,
the zeolite structure template agent or the zeolite structure directing agent is selected from weak bases and bases having a pH that is greater than 7,
the zeolite structure template agent or the zeolite structure directing agent is present as a solution,
the zeolite structure template agent or the zeolite structure directing agent is selected from tetraalkylated ammonium hydroxides, and
the medium further comprises at least one catalytic substance or at least one metal catalyst.

19. An engine exhaust depolluting system, comprising:
the at least one selective catalytic reduction filter according to claim 1; and
one of an oxidation catalytic unit, and an oxidation catalytic unit with a selective catalytic reduction unit (SCR) unit.

20. An automotive vehicle comprising:
the selective catalytic reduction filter according to claim 1.

* * * * *